United States Patent Office 3,352,640
Patented Nov. 14, 1967

3,352,640
BISMUTH DISELENIDE AND A METHOD
FOR ITS PREPARATION
Meyer Shea Silverman, Norristown, Pa., assignor to Pennsalt Chemicals Corporation, Philadelphia, Pa., a corporation of Pennsylvania
No Drawing. Filed Apr. 16, 1964, Ser. No. 360,407
6 Claims. (Cl. 23—204)

ABSTRACT OF THE DISCLOSURE

A new bismuth selenide compound is provided wherein the atomic ratio of bismuth to selenium is about 1 to 2. A method of preparation of the new bismuth diselenide is the simultaneous application of elevated temperatures and high pressure to a mixture of elemental bismuth and elemental selenium, i.e., a temperature of at least 1250° C. and a pressure of least 30 kilobars.

This invention relates to a new selenide of bismuth and, in particular, relates to bismuth selenide having a bismuth to selenium atomic ratio of less than about 1:15.

While $Bi_2Se_3$ is known, no previous reports of bismuth selenides having a Bi:S atomic ratio of less than 2:3 have been found. Chemical analyses of repeated preparations have shown the new compound of the present invention to have the approximate empirical formula $BiSe_2$. Details of these analyses are given in Examples 1 and 2.

The difference between the new lower selenide of bismuth and the previously known selenide are also demonstrated by differences in the electrical properties of the compound. The specific conductance of the new selenide was found to vary in the range of from about $1 \times 10^{-4}$ to about $32 \times 10^{-4}$ (ohm centimeter)$^{-1}$, compared to the higher measured value of $600,000 \times 10^{-4}$ to $$30,000,000 \times 10^{-4}$$

(ohm centimeter)$^{-1}$ for the previously known compound as reported in P.P Konorov, Zhur. Tekh. Fiz 26, 1394–1399 (1956); (CA 50:15146e).

While the new compound is, for all practical purposes, stable at room temperature, it is converted to the conventional $Bi_2Se_3$ when heated to temperatures of above about 290° C. This conversion reaction is accompanied by the formation of free selenium which is usually oxidized if the conversion reaction is performed in air.

The conversion of the new bismuth selenide to the conventional, more electrically conductive, form of bismuth selenide offers a useful method for sensing temperatures in excess of approximately 290° C. at which this conversion takes place. For example, a sample of the new compound can be placed in an electrical circuit so balanced that its high resistance does not permit current to flow in appreciable quantities. When the sample is raised to a temperature of about 290° C. the accompanying increase in electrical conductivity will permit current to flow. This current can be used to energize a solenoid or relay or other electrical device. Because no moving parts need be involved in such a system, it can be made resistant to high acceleration loads such as are commonly encountered in rockets and in rapidly vibrating equipment.

The raw materials for the practice of the present invention are preferably elemental bismuth and elemental selenium. The bismuth used in the preparations described in the examples of this application was Fisher Scientific Company, Reagent, Grade, more than 99.9+% pure. A technical grade of 95+% selenium from Harshaw Chemical Company was used in the preparations.

The preferred process for manufacturing the new compound involves high temperatures and high pressures. Temperatures in the range of about 1300° C. and pressures in the range of about 45 kilobars are preferred for the preparation of the new compounds of the present invention, and are utilized in the examples which follow. However, the compound of the present invention may be prepared by reactions over a range of temperatures and pressures, and the extent of this range is readily established by routine tests. It should further be understood that the new compound of the present invention is in no way dependent upon the manner in which it is formed.

The term "kilobar" as used throughout this application means 986.9 atmospheres or 14,503.8 lbs./sq. in.

The reaction time for the preparation of the new compounds may be from 1 second to about 24 hours, but best results may be obtained at reaction times of from 1 to about 15 minutes. Optimum reaction times will vary somewhat depending upon the reaction conditions and on the geometry of the reactor.

After reaction of the bismuth with the selenium, the excess raw materials must be removed from the product. This is readily accomplished by repeated washings in $CS_2$ with suction filtration followed by ethanol rinsing and air drying.

Other methods for producing the new compound, including principally the in situ reaction of ingredients capable of forming bismuth selenide, will be apparent and may be used in place of the preferred reaction of bismuth with selenium.

The apparatus used in the examples which illustrate the practice of the present invention is similar to that developed at the National Bureau of Standards and described in "Compact Multianvil Wedge Type High Pressure Apparatus," E. C. Lloyd, U. O. Hutton and D. P. Johnson in the Journal of Research of the National Bureau of Standards, vol. 63C, No. 1, July-Sept. 1959, pages 59–64. In place of the 9/16" tetrahedral sample holders used in the above reference, 5/8" holders with 1/2" anvil faces were employed in the examples which follow, and, alternatively, 5/16" holders were used with 3/4" anvil faces. A polyester film ("Mylar" manufactured by Du Pont Company) was used between the anvil assemblies and the polytetrafluoroethylene sheet ("Teflon," manufactured by Du Pont Company). Additionally, a 0.003" wall boron nitride sleeve was used between the sample and the graphite heaters as electrical insulation. Force was applied to the tetrahedral anvil system by a Watson-Stillman 100-ton hydraulic laboratory press. Pressure calibration was done by measuring the electrical resistance change of bismuth samples. Pressure was measured as a function of ram force and the three discontinuities were considered to occur at 25.4, 27.0 and 88 kilobars. In all of the preparations, a thin sleeve of spectroscopic grade graphite was used as the heating element around the sample, and end plugs of the same material isolated the sample from the platinum or silver tabs that carried the current from the anvils to the heating sleeve. Temperature calibrations were done by measuring the electrical power input required to obtain temperatures which were indicated by a Chromel-Alumel thermocouple, the tip of which was in good contact with the center of the graphite heating sleeve. The temperatures reported here are thus the highest to which any part of the sample was subjected, and it should be recognized that the ends of the sample in each case were somewhat cooler. Experience in repeated calibrations indicates that the temperature values are uncertain by approximately ±50° C., but the relative differences among the temperature levels of the experiment are believed to be quite reliable.

In each preparation the sample was first compressed in the high pressure apparatus, then heated, and then held at the desired conditions for a measured period of time.

The high pressure was then maintained until the power was turned off and the sample had cooled to nearly ambient temperature. Cooling was very rapid in all cases.

The X-ray diffraction powder pattern obtained from each run of the new bismuth selenide showed a characteristic set of lines. The X-ray patterns were obtained by use of a conventional General Electric Model XRD-1 Diffractometer using 0.5 mm. diameter glass capillaries as the same containers. Intensities were conventionally measured with a Photovolt Densicord densitometer. Major lines of the diffraction pattern were as shown in Table I.

TABLE I.—X-RAY POWDER PATTERN OF NEW BISMUTH SELENIDE

| dA | I |
|---|---|
| 3.20 | S |
| 3.00 | W |
| 2.83 | W |
| 2.71 | W |
| 2.58 | W |
| 2.27 | W |
| 2.06 | M |
| 2.07 | W |
| 1.91 | W |

S=strong, M=medium, W=weak.

TABLE II.—X-RAY POWDER PATTERN OF KNOWN $Bi_2Se_3$*

| dA observed | dA calculated | I |
|---|---|---|
| 4.579 | 4.771 | 5 |
| 2.849 | 3.045 | 10 |
| 2.196 | 2.239 | 10 |
| 2.072 | 2.105 | 6 |
| 2.039 | 2.076 | 8 |
| 1.878 | 1.904 | 9 |

*Source: H. Gobrecht, K. E. Boeters and G. Pantzer, Zeitschrift für Physik 177, 68 (1964) (partial pattern).
10=maximum intensity.

*Example 1.—Preparation of the new bismuth selenide*

A mixture of 2.2 parts of technical grade Se with one part of 99.9+% pure bismuth is finely ground in a Spex Industries heavy duty mixer mill and then pelletized with a Dickson 2-ton capacity hand press. The pellet is loaded into a boron-nitride sleeve which is in a graphite heater sleeve in a pyrophyllite tetrahedron, all as previously described in more detail. The completed tetrahedron is placed in the tetrahedral anvil apparatus and the whole assembly is then inserted between the pressure platens of a Watson-Stillman 100-ton capacity hydraulic press. Pressure on the sample is increased to about 46 kilobars and temperature is then increased to about 1295° C. and maintained for five minutes. After five minutes, the heating power is switched off and after a cooling period of an additional five minutes the pressure is released. The product is removed, washed and examined. It is found to consist of very shiny, highly reflective silver black elongated crystals. The X-ray diffraction pattern of the crystals is characteristic of the new bismuth selenide as shown in Table I. Analysis of the product by conventional gravimetric methods is in good agreement with a proposed empirical formulation of $BiSe_2$:

Found: Bi, 55.2%; Se, 41.6%. Calculated for $BiSe_2$: Bi, 57.0%; Se, 43.0%.

*Example 2.—An additional preparation of the new bismuth selenide*

An additional preparation of the new bismuth selenide of Example 1 is accomplished under a pressure of 45 kilobars at a temperature of 1280° C. maintained for 5 minutes. The X-ray diffraction pattern is found to be in good agreement with the characteristic pattern for the new bismuth selenide as shown in Table I. The product has the same appearance as that obtained in Example 1 and also analyzes in good agreement with a proposed empirical formula of $BiSe_2$.

Found: Bi, 55.4%; Se, 42.4%.

*Example 3.—Chemical reactivity of the new bismuth selenide*

When the new bismuth selenide is exposed to a number of common reagents, the results are as tabulated below:

| Reagent: | Observation |
|---|---|
| Distilled water | No reaction. |
| Concentrated hydrochloric acid | Do. |
| Concentrated nitric acid | Vigorous reaction. Product appears half white and half yellow. |
| Concentrated ammonium hydroxide | No reaction. |
| Concentrated sodium hydroxide | Sample apparently partly soluble. Seems to form solution or possibly suspension. |

*Example 4.—Determination of the density of the new bismuth selenide*

The density of the new material was measured on a Berman torsion-type density balance. The weight of each of the materials was first taken in air and then in toluene and the resulting observations were used to calculate the density.

A silver black product with an X-ray diffraction pattern identical to that shown in Table I was produced when the Bi:Se mixture was subjected to 45 kilobars, 1260° C. for 5 minutes, according to the procedures outlined in Example 1. The resulting density measured on the Berman balance in toluene and in air was 7.79±0.07 g./cc.

When a black, shiny, metallic-appearing product having the X-ray diffraction pattern shown in Table I and obtained from a run according to the raw materials and procedures of Example 1 at 46 kilobars and 1260° C. for 5 minutes was measured in the Berman balance, as above, the density measured was 7.69±0.07 g./cc. Density for the previously known form, $Bi_2Se_3$, is given in Mellor, "A Comprehensive Treatise on Inorganic and Theoretical Chemistry," vol. XI, p. 795, as being from 6.25 to 6.97 g./cc.

*Example 5.—The thermal behavior of the new bismuth selenide*

A run carried out according to the starting materials and procedures of Example 1 at a pressure of 45.6 kilobars, 1260° C. for 5 minutes, using a 1:2.2 atomic ratio of Bi:Se gave a black, shiny product with elongate crystals having the X-ray diffraction pattern of the new selenide as shown in Table I. When the product is pulverized and heated at 290° C., then cooled, the X-ray diffraction pattern of the residue shows the characteristic pattern of the previously known $Bi_2Se_3$ form.

*Example 6–13.—Additional preparations of the new bismuth selenide*

The following Examples 6–9 utilize the same procedures outlined more fully in Examples 1 and 2.

*Example 6*

A 1:2.2 atomic ratio Bi:Se mixture reacted for five minuates at 700° C. and 20 kilobars yielded the previously known $Bi_2Se_3$ form as indicated by the X-ray diffraction pattern.

*Example 7*

A 1:2.2 atomic ratio Bi:Se mixture reacted for about 5 minutes at 20 kilobars and 1000° C. yielded the previously known $Bi_2Se_3$ form as indicated by X-ray diffraction analysis of the product.

Example 8

A 1:2.2 atomic ratio Bi:Se mixture reacted for about 5 minutes at 1800° C. and 30 kilobars yielded the $Bi:Se_2$ form of the present invention as indicated by X-ray diffraction analysis.

Example 9

A 1:2.2 atomic ratio Bi:Se mixture reacted for about 5 minutes at 1295° C. and 46 kilobars gave the new bismuth selenide as shown by the characteristic X-ray diffraction pattern in Table I.

Example 10

A 1:2.2 atomic ratio Bi:Se mixture reacted for about 5 minutes at 1280° C. and 45 kilobars yielded the new bismuth selenide as indicated by the X-ray diffraction pattern in Table I.

Example 11

A 1:2.2 atomic ratio Bi:Se mixture reacted for about 5 minutes at 1260° C. and 45 kilobars yielded the new bismuth selenide as indicated by the X-ray diffraction pattern in Table I.

Example 12

A 1:2.2 atomic ratio Bi:Se mixture reacted for about 5 minutes at 1260° C. and 46 kilobars yielded the new bismuth selenide as indicated by the X-ray diffraction pattern in Table I.

Example 13

A 1:2.2 atomic ratio Bi:Se mixture reacted for about 5 minutes at 1250° C. and 45 kilobars yielded the new bismuth selenide as indicated by the X-ray diffraction pattern in Table I.

Many embodiments of this invention may be made without departing from the spirit and scope thereof, and the invention is to be understood to include all such embodiments and not to be limited by the above description and examples.

I claim:

1. Bismuth selenide, having bismuth to selenium atomic ratio of about 1:2.

2. A process for producing bismuth selenide having a bismuth to selenium atomic ration of about 1 to 2 which comprises heating to a temperature of at least about 1250° C. at a pressure of at least about 30 kilobars, a reaction mixture consisting essentially of elemental bismuth and elemental selenium.

3. The process of claim 2 wherein the bismuth to selenium atomic ratio of the starting materials is from 1:2 to 1:3.

4. The process of claim 2 wherein the bismuth to selenium atomic ratio is approximately 1:2.2.

5. The process of claim 2 wherein the temperature is about 1300° C. and the pressure is about 45 kilobars.

6. An electrical switch actuated to conduct current at temperatures above about 290° C. which comprises a piece of bismuth selenide having a bismuth to selenium atomic ratio of about 1 to 2 connected into an electrical circuit in series with a source of electromotive power and an electrical load.

References Cited

UNITED STATES PATENTS 2,957,937   10/1960   Jensen et al. _____ 75—134

OTHER REFERENCES

Pascal: Nouveau de Chimie Minerale, Masson et Cie, Editeurs, Paris, 1958, vol. XI, p. 742; vol. XIII, p. 1582.

OSCAR R. VERTIZ, *Primary Examiner.*

H. S. MILLER, *Assistant Examiner.*